United States Patent
Das et al.

(10) Patent No.: US 10,111,260 B2
(45) Date of Patent: Oct. 23, 2018

(54) RADIO RESOURCE ALLOCATION IN WI-FI AWARE NEIGHBORHOOD AREA NETWORK DATA LINKS

(71) Applicant: Intel IP Corporation, Santa Clara, CA (US)

(72) Inventors: Dibakar Das, Hillsboro, OR (US); Po-Kai Huang, West Lafayette, IN (US); Elad Oren, Tel Aviv (IL); Emily H. Qi, Portland, OR (US); Minyoung Park, Portland, OR (US)

(73) Assignee: Intel IP Corporation, Santa Clara, CA (US)

(*) Notice: Subject to any disclaimer, the term of this patent is extended or adjusted under 35 U.S.C. 154(b) by 238 days.

(21) Appl. No.: 14/963,614

(22) Filed: Dec. 9, 2015

(65) Prior Publication Data
US 2016/0374100 A1   Dec. 22, 2016

Related U.S. Application Data

(60) Provisional application No. 62/181,839, filed on Jun. 19, 2015.

(51) Int. Cl.
| H04L 12/815 | (2013.01) |
| H04W 76/02 | (2009.01) |
(Continued)

(52) U.S. Cl.
CPC ........... *H04W 76/023* (2013.01); *H04L 47/22* (2013.01); *H04W 28/24* (2013.01); *H04W 76/14* (2018.02);
(Continued)

(58) Field of Classification Search
CPC . H04L 29/06523; H04L 47/805; H04L 47/22; H04L 47/806; H04W 28/0268
See application file for complete search history.

(56) References Cited

U.S. PATENT DOCUMENTS

| 2006/0050742 A1* | 3/2006 | Grandhi ........... H04W 74/0816 370/506 |
| 2010/0103817 A1* | 4/2010 | Takayanagi ........... H04W 88/08 370/230 |

(Continued)

FOREIGN PATENT DOCUMENTS

| WO | 2013073914 | 5/2013 |
| WO | 2016204923 | 12/2016 |

OTHER PUBLICATIONS

"International Application Serial No. PCT/US2016/033223, International Search Report dated Aug. 8, 2016", 3 pgs.
(Continued)

*Primary Examiner* — Salvador E Rivas
(74) *Attorney, Agent, or Firm* — Schwegman Lundberg & Woessner, P.A.

(57) ABSTRACT

A network communication device comprises physical layer (PHY) circuitry configured to transmit and receive radio frequency electrical signals to communicate directly with one or more separate network devices; and medium access control layer (MAC) circuitry. The MAC circuitry is configured to: initiate transmission of a packetized message that includes a neighbor awareness networking (NAN) public action frame; receive a data connection request message from a second network device that includes one or more quality of service (QoS) requirements; initiate transmission of a data connection response message that includes data exchange time window information and channel information; and communicate data device-to-device with the second network device according to the data exchange time window information and channel information.

25 Claims, 5 Drawing Sheets

(51) Int. Cl.
*H04W 28/24* (2009.01)
*H04W 76/14* (2018.01)
*H04W 84/12* (2009.01)
*H04L 12/927* (2013.01)
*H04W 40/24* (2009.01)

(52) U.S. Cl.
CPC ......... *H04L 47/806* (2013.01); *H04W 40/246* (2013.01); *H04W 84/12* (2013.01)

(56) References Cited

U.S. PATENT DOCUMENTS

| | | | |
|---|---|---|---|
| 2011/0082940 A1* | 4/2011 | Montemurro | H04L 69/24 709/227 |
| 2013/0088983 A1* | 4/2013 | Pragada | H04W 16/14 370/252 |
| 2013/0121148 A1* | 5/2013 | Chiang | H04L 43/0829 370/230 |
| 2014/0211705 A1 | 7/2014 | Baek | |
| 2014/0219095 A1 | 8/2014 | Lim et al. | |
| 2014/0254513 A1* | 9/2014 | Abraham | H04W 8/005 370/329 |
| 2014/0314039 A1 | 10/2014 | Jang et al. | |
| 2014/0321409 A1* | 10/2014 | Kim | H04W 16/14 370/329 |
| 2015/0085747 A1* | 3/2015 | Cho | H04W 76/023 370/328 |
| 2016/0278112 A1* | 9/2016 | Liu | H04W 8/005 |

OTHER PUBLICATIONS

"International Application Serial No. PCT/US2016/033223, Written Opinion dated Aug. 8, 2016", 9 pgs.

\* cited by examiner

| FIELD NAME: | ATTRIBUTE ID | LENGTH | QoS STREAM ID | NOMINAL MSDU SIZE | MEAN DATA RATE | MINIMUM PHY RATE | SURPLUS BANDWIDTH ALLOWANCE |
|---|---|---|---|---|---|---|---|
| SIZE: | 1 | 1 | 1 | 2 | 4 | 4 | 2 |

| FIELD NAME: | MAXIMUM SERVICE INTERVAL | SUSPENSION INTERVAL | MINIMUM DATA RATE | BURST SIZE | PEAK DATA RATE | DELAY BOUND |
|---|---|---|---|---|---|---|
| SIZE: | 4 | 4 | 4 | 4 | 4 | 4 |

*FIG. 4*

| FIELD | SIZE (OCTETS) | VALUE | DESCRIPTION |
|---|---|---|---|
| ATTRIBUTE ID | 1 | 0xTBD | IDENTIFIES THE TYPE OF A NAN ATTRIBUTE. |
| LENGTH | 2 | VARIABLE | THE LENGTH OF THE ATTRIBUTE. |
| QoS STREAM ID | 1 | VARIABLE | AN INTEGER VALUE THAT IDENTIFIES QoS REQUIREMENTS FOR A TRAFFIC. |
| NUMBER OF TIME SLOTS | 1 | VARIABLE | AN INTEGER VALUE THAT INDICATES THE MINIMUM REQUIRED NUMBER OF MEDIUM ACCESS TIME SLOTS PER 512 TU. THE TIME SLOT IS IN UNIT OF 16 TU. |
| MAXIMUM INTERVAL | 1 | VARIABLE | AN INTEGER VALUE THAT INDICATES THE MAXIMUM INTERVAL TIME SLOT BETWEEN TWO MEDIUM ACCESS TIME SLOTS. THE TIME SLOT IS IN UNIT OF 16 TU. |

*FIG. 5*

RADIO RESOURCE ALLOCATION IN WI-FI AWARE NEIGHBORHOOD AREA NETWORK DATA LINKS

PRIORITY APPLICATION

This application claims the benefit of priority to U.S. Provisional Application Ser. No. 62/181,839, filed Jun. 19, 2015, which is incorporated herein by reference in its entirety.

TECHNICAL FIELD

Embodiments pertain to transmitting packetized data using radio access networks. Some embodiments relate to communicating information using Wi-Fi Aware networking.

BACKGROUND

Electronic devices are often interconnected by wireless means to form a network, such as a computer network for example. The devices of the wireless network communicate information using radio frequency (RF) signals, such as by spread spectrum or frequency multiplexing techniques. A wireless local area network (WLAN) is one type of network and a Wi-Fi network is a WLAN implemented under one of the Institute of Electrical and Electronic Engineers 802.11 standards, such as the IEEE 802.11-2012 standard published Mar. 29, 2012. Network protocols continue to evolve to enable more types of devices to communicate, such as mobile devices. A challenge is to provide direct device-to-device communications while maintaining quality of service (QoS) standards on the communication medium. Thus, there are general needs for devices, systems and methods that provide a protocol for electronic devices to communicate yet results in energy efficient operation of the devices.

BRIEF DESCRIPTION OF THE DRAWINGS

FIG. 4 is an example of a communication element that includes QoS requirements in accordance with some embodiments;

FIG. 5 is an example of a communication element that includes QoS medium time requirements in accordance with some embodiments.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
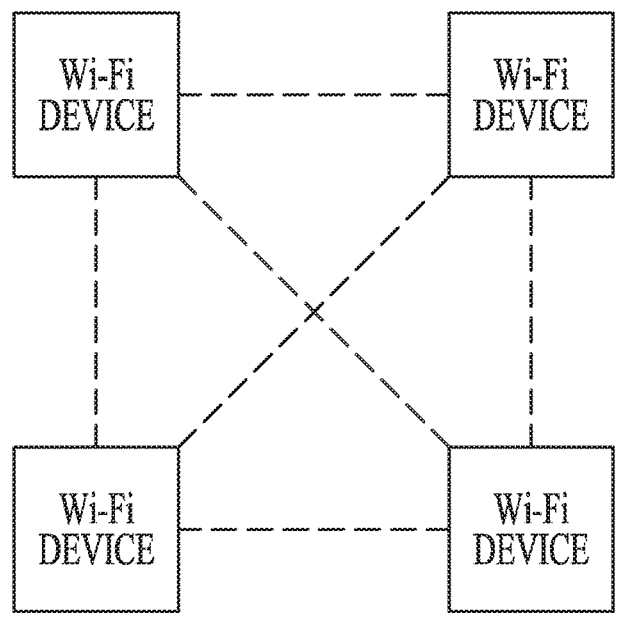
FIG. 1 illustrates a representation of a cluster of Wi-Fi devices that may form a WLAN in accordance with some embodiments.

FIG. 1 illustrates a representation of a cluster of Wi-Fi devices that may form a WLAN. WLANs are a popular means to facilitate communication among electronic devices. The operation of the network is distributed and coordinated among the wireless communication devices that make up the nodes of the network. Some examples of these devices include communication stations and portable electronic devices such as cellular telephones, smart phones, and portable computers such as laptop or tablet computers.

Wi-Fi Aware capability may allow mobile devices to discover other nearby devices and form a network while minimizing device power. When a device joins such a network, the device can launch applications that use the network services available. A challenge to implementing a W-Fi aware network, is that the infrastructure for a conventional WLAN is typically not available. For example, an access point (AP) for the network may not be available and the communication may need to be device-to-device among the mobile devices. This leaves it up to the devices themselves to communicate the network resources and determine data link characteristics, which are conventionally set and communicated by the AP.

Figure 2:
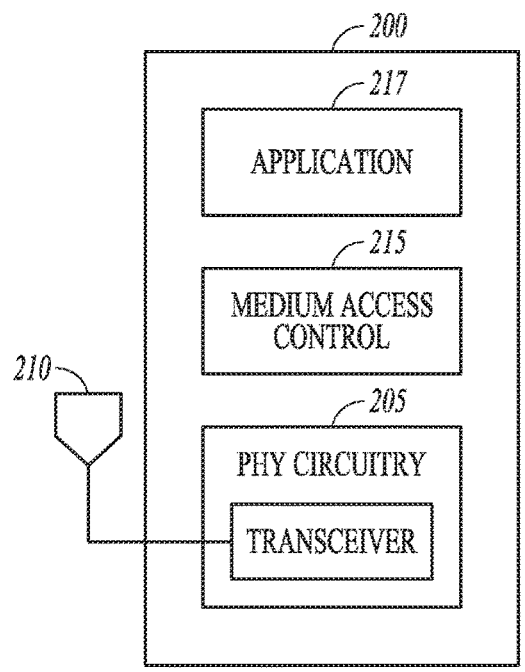
FIG. 2 shows a block diagram of portions of a network communication device in accordance with some embodiments.

FIG. 2 shows a block diagram of portions of an example of a network communication device 200, such as a network station or STA, a portable electronic device such as a cellular telephone, smart phone, portable computer such as a laptop or a tablet computer.

The network device includes physical layer (PHY) circuitry. The PHY circuitry 205 includes a transceiver circuit that transmits and receives radio frequency electrical signals to communicate directly with one or more separate network devices in accordance with a Wi-Fi communication protocol. In certain examples, the PHY circuitry 205 may communicate in accordance with a Wi-Fi Aware communication protocol. The PHY circuitry 205 may include circuitry for modulation/demodulation, upconversion/downconversion, filtering, amplification, etc. The PHY circuitry 205 can be electrically coupled to one or more antennas 210. The antennas may comprise one or more directional or omnidirectional antennas, including, for example, dipole antennas, monopole antennas, patch antennas, loop antennas, microstrip antennas or other types of antennas suitable for transmission of RF signals. In some embodiments, instead of two or more antennas, a single antenna with multiple apertures may be used. In these embodiments, each aperture may be considered a separate antenna.

The device also includes medium access control layer (MAC) layer circuitry 215 and an application 217 to execute on the device. The MAC layer circuitry 215 can include hardware processing circuitry (e.g., a microprocessor) to execute instructions included in one or both of software and firmware to perform the functions described. The MAC layer circuitry can control access to the transceiver, format information for transmission, and extracting received information.

To form a network using Wi-Fi Aware capability, a set of nearby devices may go through a discovery process. The devices may form a cluster by synchronizing to the same clock, and converging to a time period and channel, called a discovery window (DW), in which a device advertises its services and discovers the services of other devices. After the discovery process, the devices communicate with each other as a group. The group of devices may communicate according to specified time periods and channels, referred to as "timeblocks." Announcement of the timeblocks are made by one or more devices in the group during the DW.

A timeblock can include a Negotiation Time (NT) and a Data Transmission Time (DTxT). The NT may also be referred to as a Paging Time or Traffic Indication Time. During a NT, the devices of the group negotiate with each other by communicating paging messages to find out whether there is device-to-device data traffic to be communicated. During a DTxT, the actual data is exchanged.

Data is communicated according to a packetized message protocol. To ensure QoS, packets with data having stringent deadline requirement (e.g., packets containing voice data and video data) should be transferred with a higher priority than packets of other data types. This means that the devices need to schedule timeblocks to meet the QoS demands in view of the service parameters that are available to the group of devices.

To match the QoS demands to the services available among devices of the network group, the QoS requirements can be communicated during the setup of connection between devices. One the devices may transmit the QoS requirement information to another device. In some embodiments, the QoS requirement information can be sent from the device with data to transmit to the device that is to receive the data, or from the device that receives the data to the device that transmits the data.

For a direct device-to-device connection, one of the devices may take on the role of a scheduler for timeblocks based on the constraints of the resources of the device (e.g., the number of connections the device can support, etc.). In some embodiments, the QoS requirement information can be sent from the non-scheduler device to the scheduler device. Using the QoS requirement information, the scheduler device determines the set of timeblocks that will be used for a data exchange and announces the set of timeblocks to the non-scheduler. The non-scheduler device exchanges data with the scheduler device during some or all of the announced timeblocks.

Figure 3:
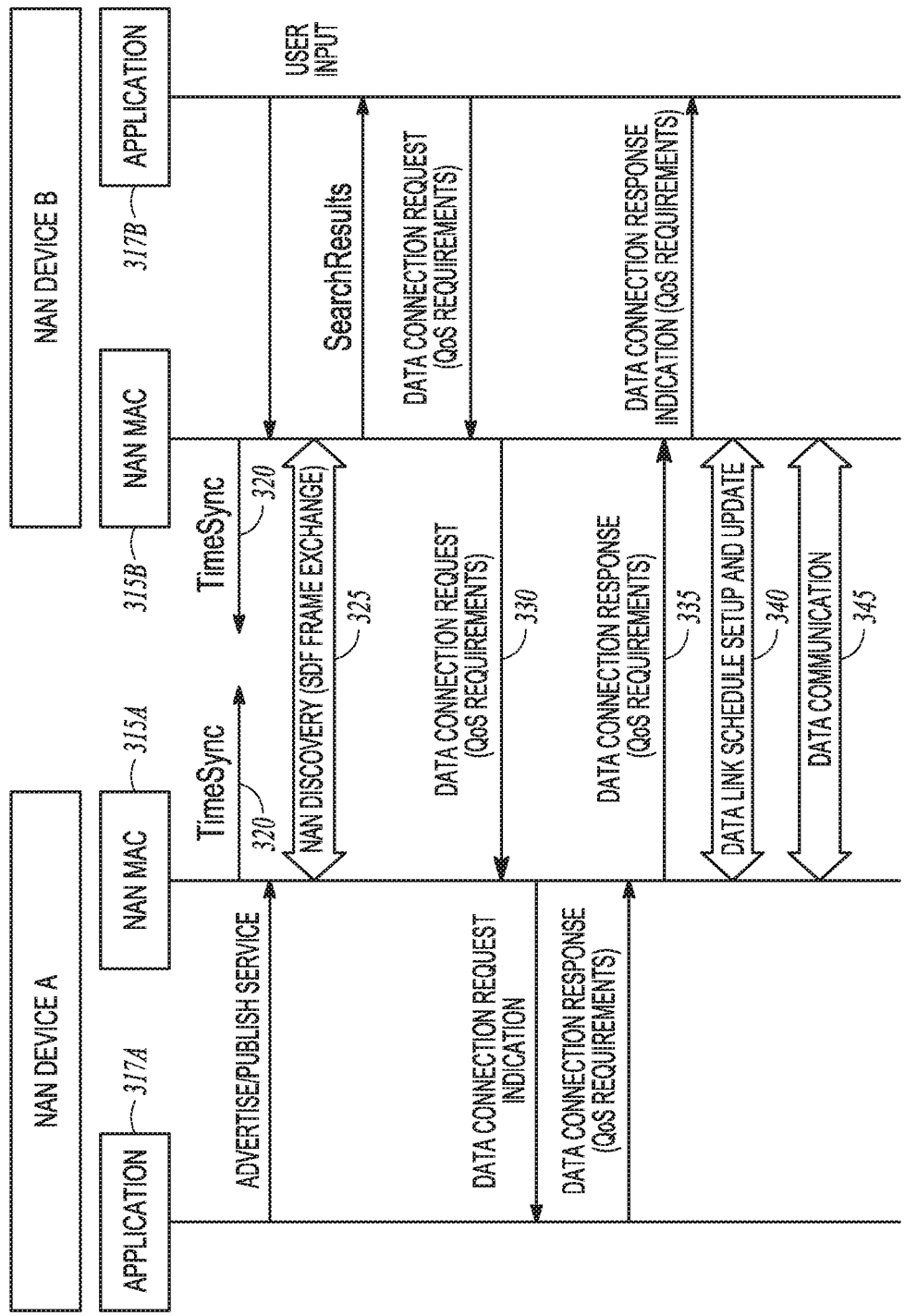
FIG. 3 shows an example of a communication protocol to establish a NAN data link and communicate QoS information device-to-device using the NAN data link in accordance with some embodiments.

FIG. 3 shows an example embodiment of a communication protocol to establish a neighbor awareness networking (NAN) data link and communicate QoS requirement information device-to-device using the NAN data link. The example includes a first network device designated as NAN Device A in FIG. 3 and a second network device designated as NAN Device B in FIG. 3. Each device is shown to include MAC layer circuitry 315A, 315B and an Application 317A, 317B executing on the NAN Device.

The two devices form a cluster by synchronizing 320 to the same clock. Assume application 317A has services to publish or advertise. During a NAN discovery window (DW) 325, devices of the cluster advertise their services. The MAC layer circuitry 315A of NAN Device A initiates transmission of a packetized message that includes a neighbor awareness networking (NAN) public action frame. The NAN public action frame or frames are used to transport the network services information of the device. The network services information may include one or more generic advertisement service (GAS) message frames.

NAN Device B may be interested in one or more services provided by NAN Device A and may wish to exchange data with NAN Device A. In response to the NAN public action frame, the MAC layer circuitry 315A of NAN Device A may receive a data connection request message 330 from NAN Device B. The data connection request can include one or more QoS attributes or requirements. The data connection request message 330 may be processed by one or more layers of NAN Device A that reside above the MAC layer.

In response to the data connection request, the MAC layer circuitry 315A of NAN Device A initiates transmission of a data connection response message 335 that includes the data exchange time window information and channel information for the data exchange. In some embodiments, the data connection response message 335 indicates one or more timeblocks for data communication with the second network device. In certain embodiments, the data connection response message includes an availability bitmap that indicates or announces a length of the timeblocks and a frequency of the timeblocks. In some embodiments, the data connection response message is a packetized message that includes the data exchange time window information and a second NAN public action frame.

Using the communicated timeblock information, the data communication schedule is setup or updated 340, such as during a negotiation time for example. The two network devices then communicate data 345 device-to-device according to the data exchange time window information and channel information.

FIG. 4 is an example embodiment of a communication element that includes QoS requirements. The name of the Field of the element and an example size in octets is shown. In some embodiments, the QoS requirements of the data connection request message include indications of QoS Stream identifier (ID), a nominal MAC service data unit (MDSU) size, a mean data rate, a minimum PHY rate, and surplus bandwidth allowance for each supported traffic stream. MDSU refers to the data unit received from a logical link control (LLC) sublayer which lies above the MAC layer in a protocol stack of the NAN device. The LLC and the MAC layer may be a data link layer (DLL) for the NAN device. The mean data rate, a minimum PHY rate may be determined according to the type of data to be communicated. For example, video and voice data may require a higher data rate than communication than text data. As shown in FIG. 4, other QoS requirements can include one or more of a maximum service interval, a suspension interval, minimum data rate, a burst size, a peak data rate, a minimum medium access time for a discovery window interval, and a delay bound for each supported traffic stream.

Upon receiving the QoS requirements for the data exchange, processing circuitry of NAN device A determines the number and location of timeblocks necessary to accommodate the data connection request. In some embodiments, NAN Device A uses the QoS requirements to the number and location of timeblocks as a data communication schedule that does not affect pre-existing connections between NAN Device A and other devices different from NAN Device B. If NAN Device A can accommodate the request, the device announces or otherwise indicates the new connection schedule in the data connection response message. If the device cannot accommodate the communication request, the data connection response message indicates the data connection request is not accepted.

An example of calculating timeblocks follows. Assume that the two devices of FIG. 3 are communicating to establish a data link, and NAN Device A is calculating the minimum number of timeblocks required to support the data traffic for the service request. For simplicity, QoS requirements such as minimum and maximum service delay, delay bound etc. are not considered. NAN Device A may calculate an estimate of the occupancy time for the request according to $T_{medium\_time\_new}$=(Surplus Bandwith Allowance)×(pps)×(MPDU ExchangeTime, where:

pps=(Ceiling)×((Mean Data Rate/8)/Nominal MSDU Size), and MPDUExchangeTime=(Nominal MSDU transmission duration at the minimum PHY rate)+SIFS+acknowledge duration.

If the calculated $T_{medium\_time\_new}$ denotes the estimated occupancy time for other connections associated with NAN Device A as the receiver, $N_{max}$ denotes the maximum number of timeblocks that can be used between two successive DWs, $T_{time\_block}$ denotes the length of each timeblock, and $T_{DW\_period}$ denotes the time between successive DW intervals, then the minimum number of timeblocks needed to support the number N of the new and existing connections is $$N = (\text{Ceiling}) \times ((T_{medium\_time\_new} + T_{medium\_time\_new}) \times (T_{time\_block}/T_{DW\_period})).$$

If $N > N_{max}$, then the new connection cannot be supported. If the new connection cannot be supported, the receiving device indicates in the data connection response message that the data connection request is not accepted. The data receiving device and the data transmitting device may then treat the data frames for this connection as that associated with a Best Effort category.

If $N \leq N_{max}$, then the new connection can be supported, and the data transmitting device transmits data packets and the data receiving device triggers frames for the connection. The data receiving device may receive data priority information in the data connection request message. One or both of the receiving device and the transmitting device track time associated with successful and unsuccessful data packet transmissions between the devices. In some embodiments, one or both of the receiving device and the transmitting device maintain a variable to track time used in the connection (e.g., used_time). This used_time variable is incremented with every successful or unsuccessful data packet transmission for the connection. In certain embodiments, the size of the increment equals the duration of the packet transmission and its associated acknowledge (ACK). The used_time is periodically reset to zero by the devices.

One or both of the receiving device and the transmitting device track an accepted data exchange time window, which is the time allotted for the connection by the receiving device. In certain embodiments, one or both of the receiving device and the transmitting device maintain a variable (e.g., accepted_time) to represent the time admitted by the receiving device for the connection. In certain embodiments, the value of the variable is calculated using a medium time parameter included in the QoS requirements. The devices compare the tracked used time to the accepted data exchange window. The devices communicate data packets device-to-device according to the data priority information when the tracked number is less than the accepted data exchange time window. If the tracked number is greater than or equal to the accepted data exchange time window, the devices may communicate according to a best effort priority.

In determining the data exchange time window information, NAN Device A may prioritize use of channels that have been observed to be less busy to avoid lack of data transmitting opportunities due to interference from other devices. In some embodiments, the MAC circuitry includes processing circuitry configured to calculate the data exchange time window information using channel traffic information. Timeblocks may be scheduled by calculating and weighing the probability of certain channels being busy. The processing circuitry may determine the value of the probability based on past observations of channel traffic. In some embodiments, devices in the cluster periodically transmit per channel load information. In certain embodiments, a device includes the per channel load information in the packetized message that includes the NAN public action frame.

According to some embodiments, the QoS requirements are communicated in a data connection request message that includes one or more QoS medium time requirements. NAN Device A may use the QoS requirements to calculate the required medium access time and directly communicate the required medium access time to its peer device NAN Device B.

FIG. 5 is an example embodiment of a communication element that includes QoS medium time requirements. The name of the Field of the element and an example size in octets is shown. The QoS requirements of the data connection request message may include indications of a QoS Stream ID, the minimum required number of medium access time slots, and the maximum interval time slot between two medium access time slots. The minimum number of time slots can be an integer value that indicates the minimum required number of medium access time slots per 512 time units (TU). A time unit is typically 1024 microseconds (μs). The time slot value can be in units of 16 TUs. The maximum interval time slot can be an integer value in units of 16 TUs.

According to some embodiments, the QoS requirements are communicated in a data connection request message that includes one or more traffic specification (TSPEC) elements of an IEEE 802.11 family of standards. The TSPEC message m ay contain one or more of the QoS requirements described previously. In some embodiments, a device may send the TSPEC message to request services only when the data connection session is to communicate voice data traffic or video data traffic. In certain embodiments, the device only sends the TSPEC message when the receiving device has an admission control mandatory (ACM) bit enabled for voice and video access categories. ACM bits may be included in a parameter set element within a NAN public action frame transmitted by the receiving device.

If the recipient of the TSPEC message is a data transmitting device, the TSPEC element may include the traffic class (TCLAS) element to allow the transmitting device to identify packets belonging to the particular traffic stream between the transmitting-receiving device pair. The sender of the TSPEC message may include packet priority within either a user priority (UP) sub-field of the traffic specification info field in the TSPEC message or in the associated UP filed of the associated TCLAS element. Reserved bits of the TSPEC elements may be used to add new parameters for the device-to-device connection capability or old parameters may be removed from the TSPEC message to accommodate the device-to-device connection capability. The TSPEC elements may be included in the NAN public action frame or can be included in a separate add traffic stream (ADDTS) request frame.

Figure 6:
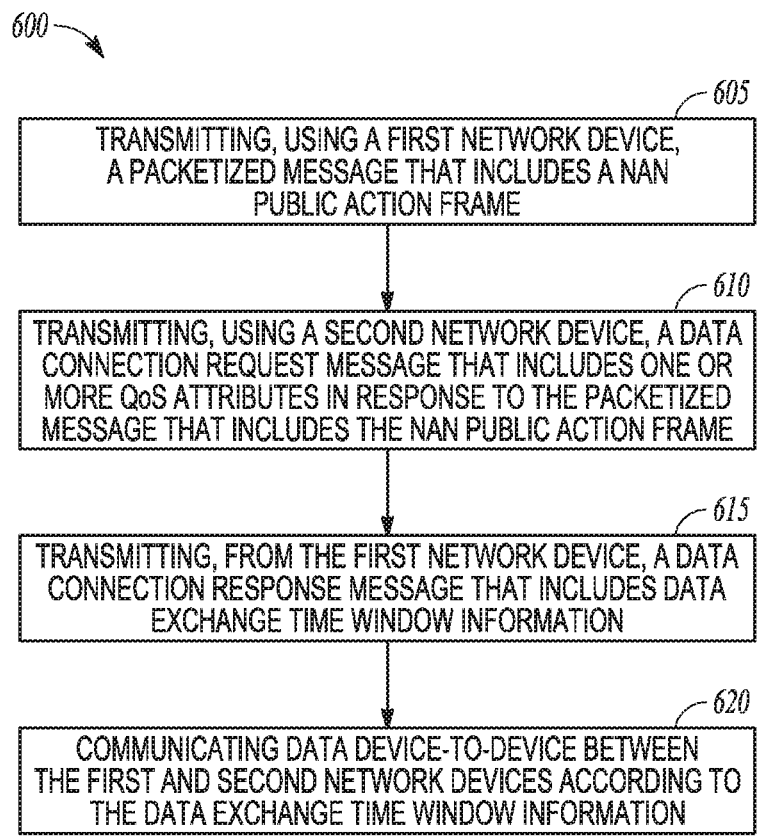
FIG. 6 is a flow diagram of a method of operating wireless network devices in accordance with some embodiments.

FIG. 6 is a flow diagram of an example embodiment of a method 600 of operating wireless network devices. At 605, a first network device (e.g., a first STA) transmits a packetized message that includes a neighbor awareness networking (NAN) public action frame. The public action frame may announce services that the first network device can provide.

At 610, in response to the packetized message that includes the NAN public action frame, a second network device (e.g., a second STA) transmits a data connection request message that includes one or more quality of service (QoS) requirements. The first network device calculates data exchange time window information using the QoS requirement information, and 615 transmits a data connection response message that includes the data exchange time window information. At 620, the first and second network devices communicate data device-to-device according to the data exchange time window information.

Figure 7:
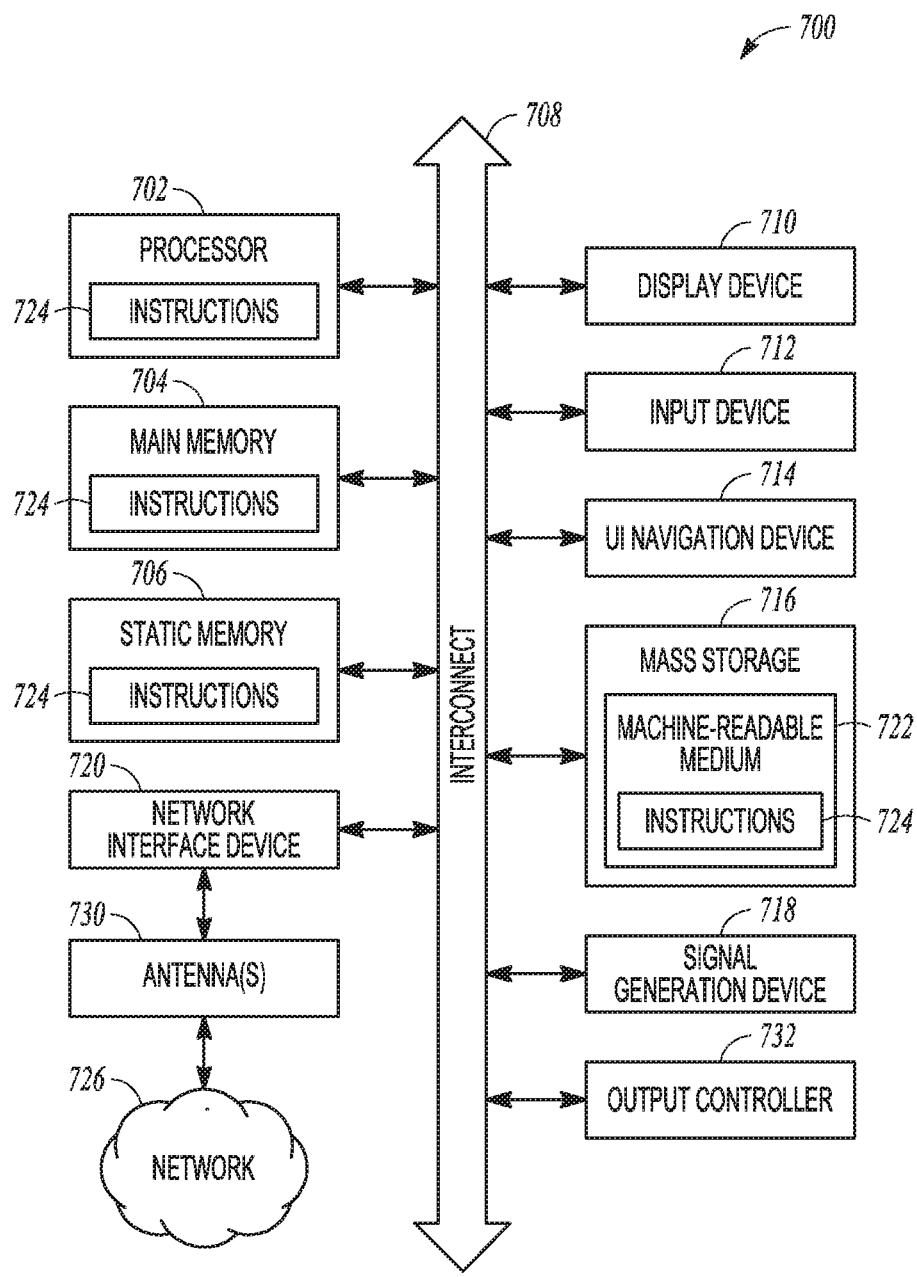
FIG. 7 illustrates a block diagram of an example machine in accordance with some embodiments.

FIG. 7 illustrates a block diagram of an example machine 700 upon which any one or more of the techniques (e.g., methodologies) discussed herein may perform. In alternative embodiments, the machine 700 may operate as a standalone device or may be connected (e.g., networked) to other machines. In a networked deployment, the machine 700 may operate in the capacity of a server machine, a client machine, or both in server-client network environments. In an example, the machine 700 may act as a peer machine in peer-to-peer (P2P) (or other distributed) network environment. The machine 700 may be a mobile device such as a personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 700 may include a hardware processor 702 (e.g., a central processing unit (CPU), a graphics processing unit (GPU), a hardware processor core, or any combination thereof), a main memory 704 and a static memory 706, some or all of which may communicate with each other via an interlink (e.g., bus) 708. The machine 700 may further include a display unit 710, an alphanumeric input device 712 (e.g., a keyboard), and a user interface (UI) navigation device 714 (e.g., a mouse). In an example, the display unit 710, input device 712 and UI navigation device 714 may be a touch screen display. The machine 700 may additionally include a storage device (e.g., drive unit) 716, a signal generation device 718 (e.g., a speaker), a network interface device 720, and one or mole sensors 721, such as a global positioning system (GPS) sensor, compass, accelerometer, or other sensor. The machine 700 may include an output controller 732, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 716 may include a machine readable medium 722 on which is stored one or more sets of data structures or instructions 724 (e.g., software) embodying or utilized by any one or more of the techniques or functions described herein. The instructions 724 may also reside, completely or at least partially, within the main memory 704, within static memory 706, or within the hardware processor 702 during execution thereof by the machine 700. In an example, one or any combination of the hardware processor 702, the main memory 704, the static memory 706, or the storage device 716 may constitute machine readable media.

While the machine readable medium 722 is illustrated as a single medium, the term "machine readable medium" may include a single medium or multiple media (e.g., a centralized or distributed database, and/or associated caches and servers) configured to store the one or more instructions 724.

The term "machine readable medium" may include any medium that is capable of storing, encoding, or carrying instructions for execution by the machine 700 and that cause the machine 700 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 724 may further be transmitted or received over a communications network 726 using a transmission medium via the network interface device 720 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 720 may include one or more physical jacks (e.g., Ethernet, coaxial, or phone jacks) or one or more antennas to connect to the communications network 726. In an example, the network interface device 720 may include a plurality of antennas to wirelessly communicate using at least one of single-input multiple-output (SIMO), multiple-input multiple-output (MIMO), or multiple-input single-output (MISO) techniques. In some examples, the network interface device 720 may wirelessly communicate using Multiple User MIMO techniques. The term "transmission medium" shall be taken to include any intangible medium that is capable of storing, encoding or carrying instructions for execution by the machine 700, and includes digital or analog communications signals or other intangible medium to facilitate communication of such software The several embodiments of devices and methods described herein help to ensure quality of service when transmitting data packets with stringent deadline requirements. The devices negotiate parameters for the device-to-device data link without the need of a WLAN infrastructure such as an access point.

ADDITIONAL DESCRIPTION AND EXAMPLES

Example 1 can include subject matter (such as an apparatus of a station or STA) comprising physical layer (PHY) circuitry configured to transmit and receive radio frequency electrical signals to communicate directly with one or more separate network devices; and medium access control layer (MAC) circuitry configured to initiate transmission of a packetized message that includes a neighbor awareness networking (NAN) public action frame; receive a data connection request message from a second network device that includes one or more quality of service (QoS) requirements; initiate transmission of a data connection response message that includes data exchange time window information and channel information; and communicate data device-to-device with the second network device according to the data exchange time window information and channel information.

In Example 2, the subject matter of Example 1 optionally includes the data connection response message optionally indicates one or more timeblocks for data communication with the second network device.

In Example 3, the subject matter of Example 2 optionally includes the data connection response message including an availability bitmap that indicates a length of the timeblocks and a frequency of the timeblocks.

In Example 4, the subject matter of one or any combination of Example 3 1-3 optionally includes the data connection response message including a packetized message that includes the data exchange time window information and a second NAN public action frame.

In Example 5, the subject matter of one or any combination of Examples 1-4 optionally includes the QoS requirements of the data connection request message including indications of a nominal MAC service data unit (MDSU) size, a mean data rate, a minimum PHY rate, and surplus bandwidth allowance for each supported traffic stream.

In Example 6, the subject matter of one or any combination of Examples 1-5 optionally includes the QoS requirements of the data connection request message including one or more of a QoS stream ID, a maximum service interval, a suspension interval, minimum data rate, a burst size, a peak data rate, and a delay bound for each supported traffic stream.

In Example 7, the subject matter of one or any combination of Examples 1-6 optionally includes the QoS requirements of the data connection request message including an indication of a minimum medium access time for a discovery window interval and a delay bound for each supported traffic stream.

In Example 8, the subject matter of one or any combination of Examples 1-7 optionally includes the QoS requirements of the data connection request message include an indication of a minimum number of medium access time slots for a discovery window interval and a maximum interval time slot between two medium access time slots.

In Example 9, the subject matter of one or any combination of Examples 1-8 optionally includes MAC circuitry including processing circuitry configured to calculate the data exchange time window information using channel traffic information.

In Example 10, the subject matter of one or any combination of Examples 1-9 optionally includes the NAN public action frame of the packetized message indicating a service provided by the network device.

In Example 11, the subject matter of one or any combination of Examples 1-10 optionally includes the NAN public action frame of the packetized message including per channel load information.

In Example 12, the subject matter of one or any combination of Examples 1-11 optionally includes MAC circuitry configured to: receive data priority information in the data connection request message; track time associated with successful and unsuccessful data packet transmissions between the network device and the second network device; compare the tracked number to an accepted data exchange time window; communicate data packets according to the data priority information when the tracked number is less than the accepted data exchange time window; and communicate information according to a best effort priority when the tracked number is greater than or equal to the accepted data exchange time window.

In Example 13, the subject matter of one or any combination of Examples 1-12 optionally includes the data connection request message including one or more traffic specification (TSPEC) elements of an IEEE 802.11 family of standards.

Example 14 can include subject matter (such as an apparatus of a station or STA) or can optionally be combined with the subject matter of one or any combination of Examples 1-13 to include such subject matter comprising physical layer (PHY) circuitry configured to transmit and receive radio frequency electrical signals to communicate directly with one or more separate network devices via a wireless local area network (WLAN); and medium access control layer (MAC) circuitry configured to: detect transmission of a packetized message from a second network device that includes a neighbor awareness networking (NAN) public action frame, wherein the NAN public action frame indicates a service provided by the second network device; initiate transmission of a data connection request message that includes one or more quality of service (QoS) requirements; receive a data connection response message that includes data exchange time window information; and communicate data device-to-device with the second network device according to the data exchange time window information.

In Example 15, the subject matter of Example 14 optionally includes the QoS requirements of the data connection request message including indications of a nominal MAC service data unit (MDSU) size, a mean data rate, a minimum PHY rate, and surplus bandwidth allowance, and at least one or more of a maximum service interval, a suspension interval, minimum data rate, a burst size, a peak data rate, and a delay bound for each supported traffic stream.

In Example 16, the subject matter of one or both of Examples 14 and 15 optionally include the QoS requirements of the data connection request message including an indication of a minimum medium access time for a discovery window interval and a delay bound for each supported traffic stream.

In Example 17, the subject matter of one or any combination of Examples 14-16 optionally includes the QoS requirements of the data connection request message include an indication of a minimum number of medium access time slots for a discovery window interval and a maximum interval time slot between two medium access time slots.

In Example 18, subject matter of one or any combination of Examples 14-17 optionally includes the MAC circuitry is configured to extract timeblock information for data communication with the second network device, wherein the extracted timeblock information includes an availability bitmap that indicates a length of the timeblocks and the frequency of the timeblocks.

In Example 19, the subject matter of one or any combination of Examples 14-18 optionally including the data connection request message includes one or more traffic specification (TSPEC) elements of an IEEE 802.11 family of standards.

In Example 20, the subject matter of one or any combination of Examples 14-19 optionally includes MAC circuitry configured to: include data priority information in the data connection request message; track time associated with successful and unsuccessful data packet transmissions between the network device and the second network device; compare the tracked number to an accepted data exchange time window; communicate data packets according to the data priority information when the tracked number is less than the accepted data exchange time window; and communicate information according to a best effort priority when the tracked number is greater than or equal to the accepted data exchange time window.

In Example 21, the subject matter of one or any combination of Examples 14-20 optionally includes MAC circuitry is configured to initiate transmission of the data connection request message only to request a data connection session that is to communicate one or both of voice data traffic and video data traffic.

Example 22 includes subject matter (such as a method, a means for performing acts, or a computer readable storage medium including instructions that, when executed by hardware processing circuitry of a wireless network device, cause the wireless network device to perform acts), or can optionally be combined with the subject matter of one or any combination of Examples 1-21 to include such subject matter, comprising initiating transmission of a packetized message that includes a neighbor awareness networking (NAN) public action frame; receiving a data connection request message from a second network device that includes one or more quality of service (QoS) requirements; initiating transmission of a data connection response message that includes data exchange time window information that indicates one or more timeblocks for data communication with the second network device; and communicating data device-to-device with the second network device according to the data exchange time window information.

In Example 23 the subject matter of Example 22 optionally includes initiating transmission of a data connection response message that includes an availability bitmap that indicates a length of the timeblocks for data communication with the second network device and frequency of the timeblocks.

In Example 24, the subject matter of one or both of Examples 22 and 23 optionally includes calculating the data exchange time window information using QoS requirements that include indications of a nominal MAC service data unit (MDSU) size, a mean data rate, a minimum PHY rate, and surplus bandwidth allowance for each supported traffic stream.

In Example 25, the subject matter of one or any combination of Examples 22-24 optionally includes calculating the data exchange time window information using QoS requirements that include indications of one or more of a maximum service interval, a suspension interval, minimum data rate, a burst size, a peak data rate, minimum medium access time, and a delay bound for each supported traffic stream.

In Example 26, the subject matter of one or any combination of Examples 22-25 optionally includes calculating the data exchange time window information using QoS requirements that include an indication of a minimum number of medium access time slots for a discovery window interval and a maximum interval time slot between two medium access time slots.

In Example 27, the subject matter of one or any combination of Examples 22-26 optionally includes calculating the data exchange time window information using channel traffic information.

In Example 28, the subject matter of one or any combination of Examples 22-27 optionally includes initiating transmission of a NAN public action frame that includes per channel load information.

In Example 29, the subject matter of one or any combination of Examples 22-28 optionally includes transmitting one or more traffic specification (TSPEC) elements of an IEEE 802.11 family of standards from the second network device in response to the packetized message that includes the NAN public action frame.

In Example 30, the subject matter of one or any combination of Examples 1-29 optionally includes receiving data priority information in the data connection request message; tracking time associated with successful and unsuccessful data packet transmissions between the network device and the second network device; comparing the tracked number to an accepted data exchange time window; communicating data packets according to the data priority information when the tracked number is less than the accepted data exchange time window; and communicating information according to a best effort priority when the tracked number is greater than or equal to the accepted data exchange time window.

These non-limiting Examples can be combined in any permutation or combination.

The above detailed description includes references to the accompanying drawings, which form a part of the detailed description. The drawings show, by way of illustration, specific embodiments in which the invention can be practiced. These embodiments are also referred to herein as "examples." All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment. Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

What is claimed is:

1. An apparatus of a station (STA) comprising:
physical layer (PHY) circuitry configured to transmit and receive radio frequency electrical signals to communicate directly with one or more separate network devices; and
medium access control layer (MAC) circuitry configured to:
initiate transmission of a packetized message that includes a neighbor awareness networking (NAN) public action frame;
receive a data connection request message from a second network device that includes one or more quality of service (QoS) requirements and data priority information;
initiate transmission of a data connection response message that includes data exchange time window information and channel information;
track time associated with successful and unsuccessful data packet transmissions between the STA and the second network device;
compare the tracked time to an accepted data exchange time window;
communicate data packets according to the data priority information when the tracked time is less than the accepted data exchange time window; and
communicate information according to a best effort priority mode when the tracked time is greater than or equal to the accepted data exchange time window.

2. The apparatus of claim 1, wherein the data connection response message indicates one or more timeblocks for data communication with the second network device.

3. The apparatus of claim 2, wherein the data connection response message includes an availability bitmap that indicates a length of the timeblocks and a frequency of the timeblocks.

4. The apparatus of claim 2, wherein the data connection response message is a packetized message that includes the data exchange time window information and a second NAN public action frame.

5. The apparatus of claim 1, wherein the QoS requirements of the data connection request message include indications of a nominal MAC service data unit (MDSU) size, a mean data rate, a minimum PHY rate, and surplus bandwidth allowance for each supported traffic stream.

6. The apparatus of claim 5, wherein the QoS requirements of the data connection request message include one or more of a QoS stream identifier, a maximum service interval, a suspension interval, minimum data rate, a burst size, a peak data rate, and a delay bound for each supported traffic stream.

7. The apparatus of claim 1, wherein the QoS requirements of the data connection request message include an indication of a minimum medium access time for a discovery window interval and a delay hound for each supported traffic stream.

8. The apparatus of claim 1, wherein the QoS requirements of the data connection request message include an indication of a minimum number of medium access time slots for a discovery window interval and a maximum interval time slot between two medium access time slots.

9. The apparatus of claim 1, wherein the MAC circuitry includes processing circuitry configured to calculate the data exchange time window information using channel traffic information.

10. The apparatus of claim 1, wherein the NAN public action frame of the packetized message indicates a service provided by the network device STA.

11. The apparatus of claim 1, wherein the NAN public action frame of the packetized message includes per channel load information.

12. The apparatus of claim 1, wherein the MAC circuitry is configured to:
communicate data packets directly with the second network device, in accordance with a device-to-device communication technique and according to a scheduled communication mode determined using the data exchange time window information and channel information; and
change to the best effort priority mode when time used to communicate the data exceeds the data exchange time information.

13. The apparatus of claim 1, wherein the data connection request message includes one or more traffic specification (TSPEC) elements of an IEEE 802.11 family of standards.

14. An apparatus of a station (STA) comprising:
physical layer (PHY) circuitry configured to transmit and receive radio frequency electrical signals to communicate directly with one or more separate network devices via a wireless local area network (WLAN); and
medium access control layer (MAC) circuitry configured to:
detect transmission of a packetized message from a second network device that includes a neighbor awareness networking (NAN) public action frame, wherein the NAN public action frame indicates a service provided by the second network device;
initiate transmission of a data connection request message that includes one or more quality of service (QoS) requirements and data priority information;
receive a data connection response message that includes data exchange time window information;
track time associated with successful and unsuccessful data packet transmissions between the STA and the second network device;
compare the tracked time to an accepted data exchange time window;
communicate data packets according to the data priority information when the tracked time is less than the accepted data exchange time window; and
communicate information according to a best effort priority mode whey the tracked time is greater than or equal to the accepted data exchange time window.

15. The apparatus of claim 14, wherein the QoS requirements of the data connection request message include indications of a nominal MAC service data unit (MDSU) size, a mean data rate, a minimum PITY rate, and surplus bandwidth allowance, and at least one or more of a maximum service interval, a suspension interval, minimum data rate, a burst size, a peak data rate, and a delay bound for each supported traffic stream.

16. The apparatus of claim 14, wherein the QoS requirements of the data connection request message include an indication of a minimum medium access time for a discovery window interval and a delay bound for each supported traffic stream.

17. The apparatus of claim 14, wherein the QoS requirements of the data connection request message include an indication of a minimum number of medium access time slots for a discovery window interval and a maximum interval time slot between two medium access time slots.

18. The apparatus of claim 14, wherein the MAC circuitry is configured to extract timeblock information for data communication with the second network device, wherein the extracted timeblock information includes an availability bitmap that indicates a length of the timeblocks and the frequency of the timeblocks.

19. The apparatus of claim 14, wherein the data connection request message includes one or more traffic specification (TSPEC) elements of an IEEE 802.11 family of standards.

20. A computer readable storage medium including instructions that, when executed by hardware processing circuitry of a wireless station device (STA), cause the STA to:
  initiate transmission of a packetized message that includes a neighbor awareness networking (NAN) public action frame;
  receive a data connection request message from a second network device that includes one or more quality of service (QoS) requirements and data priority information;
  initiate transmission of a data connection response message that includes data exchange time window information;
  track time associated with successful and unsuccessful data packet transmissions between the STA and the second network device;
  compare the tracked time to an accepted data exchange time window;
  communicate data packets according to the data priority information when the tracked time is less than the accepted data exchange time window; and
  communicate information according to a best effort priority mode when the tracked time is greater than or equal to the accepted data exchange time window.

21. The computer readable storage medium of claim 20, including instructions to cause the STA to initiate transmission of a data connection response message that indicates one or more timeblocks for data communication with the second network device and includes an availability bitmap that indicates a length of the timeblocks for data communication with the second network device and frequency of the timeblocks.

22. The computer readable storage medium of claim 20, including instructions to cause the STA to calculate the data exchange time window information using QoS requirements that include indications of a nominal MAC service data unit (MDSU) size, a mean data rate, a minimum PHY rate, and surplus bandwidth allowance for each supported traffic stream.

23. A method of controlling operation of a wireless station device (STA), the method comprising:
  initiating transmission of a packetized message that includes a neighbor awareness networking (NAN) public action frame;
  receiving a data connection request message from a second network device that includes one or more quality of service (QoS) requirements and data priority information;
  initiating transmission of a data connection response message that includes data exchange time window information;
  track time associated with successful and unsuccessful data packet transmissions between the STA and the second network device:
  compare the tracked time to an accepted data exchange time window;
  communicate data packets according to the data priority information when the tracked time is less than the accepted data exchange time window; and
  communicate information according to a best effort priority mode when the tracked time is greater than or equal to the accepted data exchange time window.

24. The method of claim 23, including initiating transmission of a data connection response message that indicates one or more timeblocks for data communication with the second network device and includes an availability bitmap that indicates a length of the timeblocks for data communication with the second network device and frequency of the timeblocks.

25. The method of claim 23, including calculating the data exchange time window information using QoS requirements that include indications of a nominal MAC service data unit (MDSU) size, a mean data rate, a minimum PHY rate, and surplus bandwidth allowance for each supported traffic stream.

\* \* \* \* \*

UNITED STATES PATENT AND TRADEMARK OFFICE
CERTIFICATE OF CORRECTION

PATENT NO. : 10,111,260 B2
APPLICATION NO. : 14/963614
DATED : October 23, 2018
INVENTOR(S) : Das et al.

Page 1 of 1

It is certified that error appears in the above-identified patent and that said Letters Patent is hereby corrected as shown below:

On the Title Page

Item (72), in "Inventors", in Column 1, Line 1, delete "Hilsboro," and insert --Hillsboro,-- therefor In the Claims In Column 14, Line 4, in Claim 7, delete "hound" and insert --bound-- therefor In Column 14, Line 17, in Claim 10, before "STA", delete "network device"

In Column 14, Line 61, in Claim 14, delete "whey" and insert --when-- therefor

In Column 14, Line 66, in Claim 15, delete "PITY" and insert --PHY-- therefor

In Column 16, Line 28, in Claim 23, delete "device:" and insert --device;-- therefor Signed and Sealed this
Fourth Day of June, 2019

Andrei Iancu
*Director of the United States Patent and Trademark Office*